2,838,725

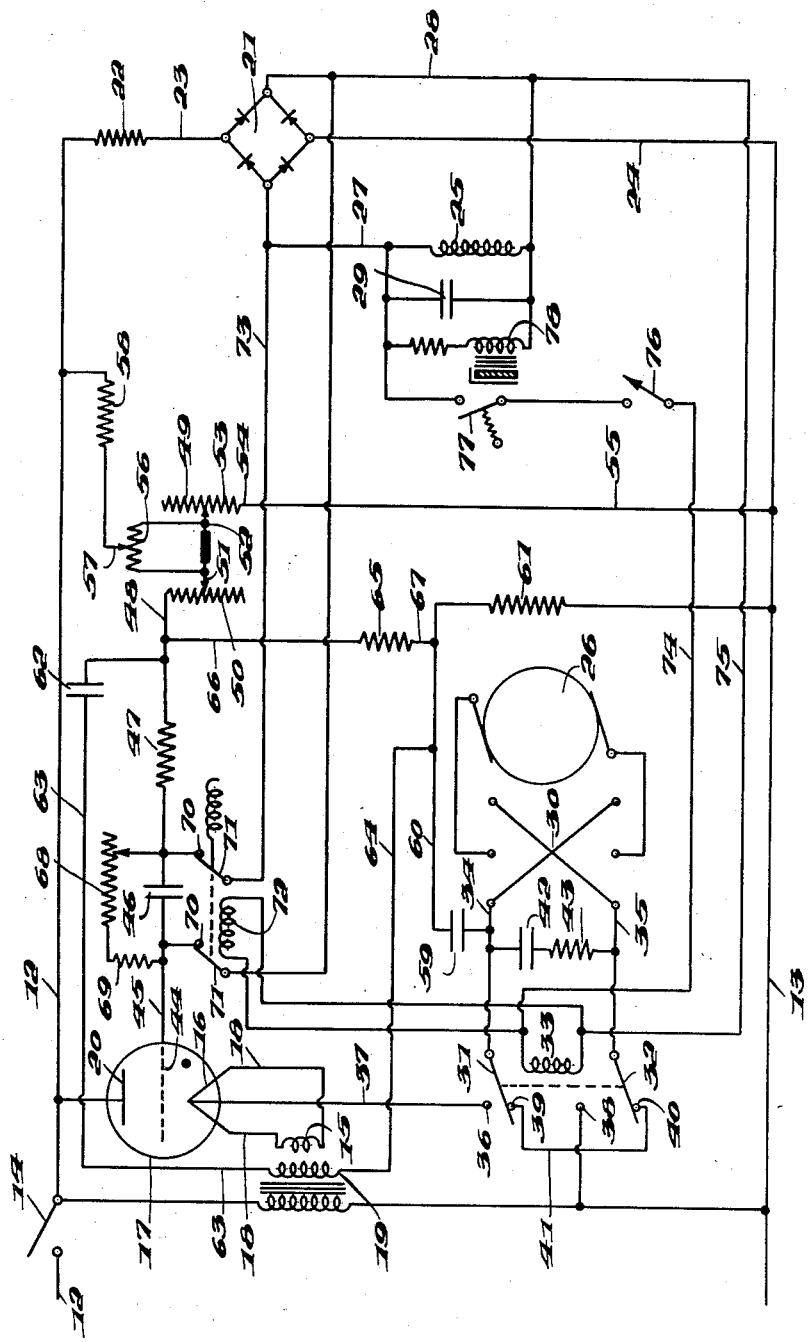

SYSTEM FOR CONTROLLING ENERGIZATION OF D. C. MOTORS CONNECTED TO A. C. SYSTEMS

Gerald K. Heller, Baltimore, Md.

Application June 16, 1955, Serial No. 515,920

5 Claims. (Cl. 318—331)

This invention relates generally to control systems and more particularly to control systems for controlling the energization of small D. C. motors connected to single phase alternating current systems.

It is an object of this invention to provide a control system for small motors that shall be simple and reliable in operation and can be readily and economically manufactured and installed.

Another object of this invention is to provide a new and improved motor control system which permits D. C. motors of standard ratings to be connected directly to A. C. lines without the use of power transformers.

Still another object of this invention is to provide a new and improved motor control system which utilizes an A. C. voltage derived from the line voltage as a reference, thereby eliminating the need for separate reference supplies.

It is also an object of this invention to provide means for automatically and gradually accelerating a small D. C. motor connected to an A. C. system.

It is also an object of this invention to provide a novel means for initially adjusting a rheostat to obtain a first rough adjustment of the desired speed of the motor together with means adjustable to give a fine control of the speed of the motor.

It is also an object of this invention to provide a novel speed control means comprising a potentiometer connected in series between a pair of variable resistors which are connected between the grid circuit of a gas-filled tube and one side of a power supply system, and with the potentiometer having a variable contact connected to the other side of the power system.

It is also an object of this invention to provide a novel filter or time-constant circuit connected to the terminals of the armature of a motor and providing a terminal point for a phase-shifting circuit comprising a capacitor and the secondary winding of a transformer.

Further objects and a fuller understanding of this invention may be had by referring to the following description and to the accompanying drawing, in which the figure is a diagrammatic view of a control system embodying the features of this invention.

As shown in the figure:

A transformer 10 is connected through its primary winding 11 to a 110 volt, 60 cycle supply, through line wires 12 and 13, and a conventional switch 14. The transformer has a first secondary winding 15 which is connected to a filament 16, of a gas-filled tube 17 by wires 18, and the transformer also has a second secondary winding 19, of ten volts, for a purpose to be explained later.

One of the line wires 12, is connected to an anode 20, of the tube 17, and it is extended to a conventional bridge-type rectifier 21, through a series resistor 22 of 50 ohms, and a wire 23, and the opposite terminal of the bridge is connected to the other line wire 13, through a wire 24.

The field winding 25 of a motor, which has an armature 26, is connected to the D. C. output terminals of the bridge by wires 27 and 28. A 100 microfarad capacitor is connected in parallel with the field winding to the wires 27 and 28.

The armature 26, is connected through a reversing switch 30 to switch arms 31 and 32 of a relay 33, by wires 34 and 35, respectively and when the relay is energized the switch arm 31, engages a contact 36, to connect one side of the armature to the filament 16 through a wire 37, and through the tube to the power line 12, and the switch arm 32 engages a contact 38 to connect the other side of the armature to the other power line 13. When the relay 33, is de-energized the switch arm 31, and the switch arm 32, engage contacts 39 and 40, respectively, and these contacts are connected together by a wire 41, so that the armature is short-circuited to dynamically brake the armature.

A 700 microfarad capacitor 42, in series with a 5 ohm current limiting resistor 43, is connected to wires 34 and 35, and so in parallel with the armature 26 and when the tube 17 fires the capacitor 42 is charged and the armature turns, and between the firings of the tube the capacitor supplies current to maintain the turning of the armature.

A grid 44, of the tube 17, is connected by a wire 45 to an eight microfarad capacitor 46, then through a 51 K resistor 47 which limits current flow to the grid, and then as wire 48 to a speed control arrangement 49. The speed control arrangement comprises a one megohm variable resistor 50, connected at one end to the wire 48 and having its movable contactor 51, ganged with the movable contactor 52, of another one megohm variable resistor 53, and with the terminal of the second resistor connected at 54 to a wire 55, connected to the power line wire 13. The movable contactors 51 and 52, are connected to the opposite ends of a 35 K potentiometer 56, and a movable contactor 57 of this potentiometer is connected through a one-tenth megohm resistor 58 to the power line wire 12. Coarse adjustment of the speed of the armature 26 can be had by moving the ganged contactors, and finer control can be had by varying the position of the potentiometer contactor 57. The potentiometer 56, connects the one megohm variable resistors in series with it between the wires 48 and 55, and permits the injection of a voltage from between the line wires 12 and 13, into the grid circuit. Thus the ganged potentiometers with contacts 51 and 52 control coarse speed adjustment and the potentiometer with contact 57 acts like an infinite resolution device, controlling the fine speed setting.

A ¼ microfarad capacitor 59, is connected to the wire 34, of the armature 26, and is connected by a wire 60 through a 150 K resistor 61, to the power line 13, to provide a ripple voltage circuit for the ripple voltage of the armature as it drains the capacitor 42 between charging pulses, and which ripple voltage increases as the load on the armature is increased at any speed setting. A .01 microfarad capacitor 62, is connected to the grid wire 48, and then by wires 63 and 64 through the ten volt secondary winding 19, of the transformer 10, and then to wire 60. This last circuit is a phase-shifting circuit, and it is connected to the time-constant circuit of the capacitor 59 and the resistor 61, and since this time-constant circuit is affected by the ripple voltage signal from the armature 26, it enables the motor to run smoothly and without jerks in speed even when the load on the motor pulls the applied armature terminal voltage down to around 60 volts.

A one megohm resistor 65 is connected to the grid wire 48, and to the wire 60, through wires 66 and 67.

The winding 19 and capacitor 62 effect a phase shifted bias voltage across the resistor 65, the connections of secondary winding 19 being such as to provide a voltage, which is 180 degrees out-of-phase with the line voltage, working into capacitor 62 and resistor 65, resulting in an A. C. bias across resistor 65 which lags the line voltage. The phase shift of this A. C. bias is made constant by the ganged-potentiometer arrangement heretofore described, which, along with resistor 61, shunts resistor 65. Any change in this shunting resistance would, of course, change the effective resistance seen by the winding 19 in series with capacitor 62. However, by this arrangement, irrespective of the setting of the ganged speed control potentiometers, this effective resistance, and hence the phase shift of the A. C. bias across resistor 65, remains substantially constant so as to provide for smooth control during low speed operation of the motor. Resistor 65 also functions to absorb microsecond width pulses feeding back through winding 19 from the line due to the firing of the thyratron.

The grid circuit capacitor 46 is shunted by a one megohm variable resistor 68, in series with an 18K resistor 69. Contacts 70 are connected to the capacitor 46, and are engaged by switch arms 71, of a de-energized relay 72, and connect the capacitor to the D. C. output terminals of the bridge rectifier 21, by wires 73, to put a tube-blocking charge on the capacitor. When the relay 72 becomes energized the capacitor 46, becomes disconnected from the D. C. source, and its charge is dissipated by the variable resistor shunt so that the rate of decay of the negative tube-blocking voltage may be controlled to control the acceleration of the armature 26.

The relays 72 and 33 are connected in parallel by wires 74 and 75. Wire 75 is connected to wire 28 of the rectifier 21, and wire 74, leads through a motor switch 76, and through a switch 77, to the other wire 27, of the rectifier. The switch 77 is operated by a time-delay relay 78, of conventional construction, and is not closed until at least 30 seconds after the filament 16 of the tube 17 has been energized so that the tube will have reached its desired temperature before the anode-cathode circuit is energized. In addition, since relay 78 is energized by the field voltage, it functions as a loss-of-field protection device, as it will open if, for any reason, field voltage is lost or decreases below the drop-out voltage of relay 78.

When the line switch 14 is first closed the filament will become heated, and there is a blocking voltage on the grid capacitor 46, and the grid 44, from the bridge rectifier. The motor switch 76 is closed, and subsequently the switch 77 closes to energize the relays 33 and 72, to put the armature under the acceleration control and under the control of the network 49. In considering the operation of the circuit after the acceleration period, it will be seen that the firing of the thyratron is a function of the instantaneous grid-to-cathode voltage. The circuit developing such voltage includes a grid resistance consisting of resistor 69, rheostat 68, and resistor 47, such grid resistance being in series with resistor 65 and capacitor 59 which returns to the cathode of the thyratron.

Considering first the voltage developed across capacitor 59, it can be seen that capacitor 59 is in series with resistor 61 across the motor armature; their values being such as to effectively be a filter having, by way of example, a time constant of about two cycles of the A. C. line frequency. Capacitor 59, then, tends to assume the average potential across the armature, including back E. M. F. and IR drop, which acts as a control voltage to provide for automatic regulation of the thyratron firing angle. To expand on this feature, it is further to be considered that since a change in motor load will reflect an immediate change in current consumption, 700 microfarad capacitor 42 will discharge to a different terminal voltage during the non-conducting portion of each cycle. However, because of the time constant of this filter, the voltage waveform across resistor 61 does not closely follow changes in voltage across the armature; or restated, a charge in armature terminal voltage does not reflect an instantaneous voltage change across capacitor 59, due to time necessary for it to charge or discharge through resistor 61. This results in a somewhat "delayed" change in the control signal across capacitor 59 in the grid to cathode circuit, so as to smooth out or filter the armature terminal voltage as reflected across capacitor 59.

It can be seen, therefore, that capacitor 59 reflects average armature potential over the filter period to control the firing angle of the thyratron so as to adjust for armature current requirements thereby tending to maintain a constant motor speed.

Considering next the resistor 65 which is in series with the capacitor 59 in the cathode-to-grid circuit, the voltage developed thereacross results from two components, the phase shifted A. C. bias from winding 19 through capacitor 62, and the adjustable amplitude speed control voltage developed from the ganged-potentiometer arrangement in circuit with resistors 65 and 61 across the line, as heretofore described.

From the foregoing it should be apparent that when the critical grid voltage characteristic of the thyratron is cut by the sum of the D. C. voltage across capacitor 59 and the A. C. voltage across resistor 65, the thyratron will fire. By adjusting the setting of the ganged potentiometers, the amplitude of the in-phase A. C. component across resistor 65 may be increased or decreased so as to cause the thyratron to fire earlier or later in the cycle and thereby commensurately increase or decrease motor speed.

While the line switch 14 remains closed, and the tube 17 remains hot, the motor may be started or stopped by manipulation of the motor switch 76.

It is to be noted in the foregoing description that the "ripple" voltage variously recited refers to the armature waveform resulting from the charging and discharging of capacitor 42, rather than what is commonly known as commutation ripple.

The numerical values given are for a control system for small motors up to about ¼ horsepower.

While only one specific embodiment of the invention is hereinbefore set forth, it is to be expressly understood that the same is not to be limited to the details or construction and arrangement of the elements as illustrated and described because various modifications may be developed in putting the invention into practice within the scope of the appended claims.

What is claimed is:

1. A control system for controlling energization of small D. C. motors from a pair of A. C. power lines, said system comprising a gas-filled tube adapted to conduct during a portion of each A. C. cycle, said tube having an anode, a grid and a cathode, a first power line connected to said anode, a motor having its armature connected to said cathode and to a second power line, means connected across said armature for supplying current to said armature during the non-conducting portion of each cycle, a rectifier connected to said first and to said second power lines, a field winding for said motor connected to D. C. output terminals of said rectifier, a time-constant circuit comprising a first capacitor and a first resistor in series connected to the armature terminals of said motor, a transformer connected to said pair of power lines, a secondary winding on said transformer, and a phase shifting circuit including a second capacitor and second resistor connected in series with said secondary winding, said second resistor connected to said grid and to a point in said time-constant circuit between said first capacitor and said first resistor.

2. A control system for controlling energization of small D. C. motors from a pair of A. C. power lines, said system comprising a gas-filled tube adapted to conduct during a portion of each A. C. cycle, said tube having an anode, a grid and a cathode, a first power line connected to said anode, a motor having its armature connected to said cathode and to a second power line, means connected across said armature for supplying current to said armature during the non-conducting portion of each cycle, means to supply D. C. to a field winding of said motor, a time-constant filter circuit comprising a capacitor and a resistor in series connected to the armature terminals of said motor, a transformer connected to said pair of power lines, a secondary winding on said transformer, a phase shifting circuit connecting said grid and a point in said time-constant circuit and comprising a capacitor and resistor in series with said secondary winding, a first variable resistor connected to said grid and having a first movable contactor, a second variable resistor connected to said second power line and having a second movable contactor, means connecting said first and said second movable contactors for ganged movement, a potentiometer connected to said first and second movable contactors and so connecting said first and said second variable resistors in series between said grid and said second power line, a third movable contactor on said potentiometer, and a resistor connected to said third movable contactor in series therewith to said first power line.

3. A control system for controlling energization of small D. C. motors from a pair of A. C. power lines, said system comprising a gas-filled tube adapted to conduct during a portion of each A. C. cycle, said tube having an anode, a grid and a cathode, a first power line connected to said anode, a motor having its armature connected to said cathode and to a second power line, means connected across said armature for supplying current thereto during the non-conducting portion of each cycle, rectifier means to supply D. C. to a field winding of said motor, a time-constant filter circuit comprising a capacitor and a resistor in series connected to the armature terminals of said motor, a transformer connected to said pair of power lines, a secondary winding on said transformer, a capacitor in series with said grid, a variable resistor shunting said capacitor, a first resistor connected to said grid, a second resistor connected to said second power line, a potentiometer having its ends connected to said first and to said second resistor, respectively, a variable contact on said potentiometer, a third resistor in series connecting said variable tap to said first power line, a phase shifting circuit comprising a capacitor in series with a fourth resistor and said secondary winding, said fourth resistor connected between said grid at a point intermediate said shunted grid capacitor and said first variable resistor and to said time-constant circuit at a point intermediate said capacitor and said resistor thereof, a first means actuable to disconnect said armature from said cathode and from said second power line, and a second means actuable in synchronism with said first means and movable to connect said shunted capacitor to the D. C. output terminals of said rectifier means.

4. A thyratron control circuit for direct current motors comprising a thyratron having an anode, a grid and a cathode, a motor having an armature connected in series with said thyratron across an alternating current supply, said thyratron adapted to conduct current to said armature during a portion of each cycle of alternating current, means connected across said armature for supplying current to said armature during the non-conducting portion of each cycle, a capacitor having one terminal thereof connected to the side of said armature which is connected to said cathode, a first resistor having one terminal thereof connected to the other side of said armature, the other terminal of said first resistor being connected to the other terminal of said capacitor, said first resistor and capacitor being of such relative values so as to constitute a filter, a second resistor having one terminal thereof connected to that side of said capacitor connected to said first resistor, the other terminal of said second resistor connected through current limiting grid resistance to said grid, means for developing a phase shifted A. C. bias voltage across said second resistor, and variable resistance means for developing a variable amplitude A. C. voltage across said second resistor.

5. A thyratron control circuit for direct current motors as set forth in claim 4 wherein said variable resistance means includes means for maintaining the phase shift of said A. C. bias voltage substantially constant throughout the range of voltage amplitude settings of said variable resistance means.

References Cited in the file of this patent

UNITED STATES PATENTS

| | | |
|---|---|---|
| 2,264,333 | Satterlee | Dec. 2, 1941 |
| 2,528,688 | Chin et al. | Nov. 7, 1950 |
| 2,573,849 | Knauth et al. | Nov. 6, 1951 |
| 2,574,976 | Knauth et al. | Nov. 13, 1951 |
| 2,600,003 | Knauth | June 10, 1952 |
| 2,689,320 | Aloiso | Sept. 14, 1954 |